L. JAKAB.
CUSPIDOR.
APPLICATION FILED MAR. 12, 1910.
972,081.
Patented Oct. 4, 1910.
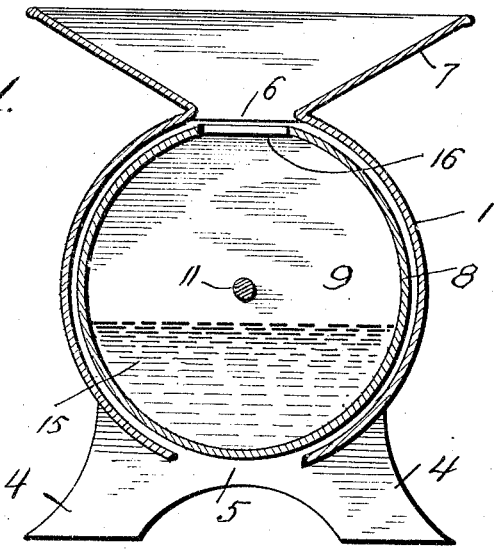
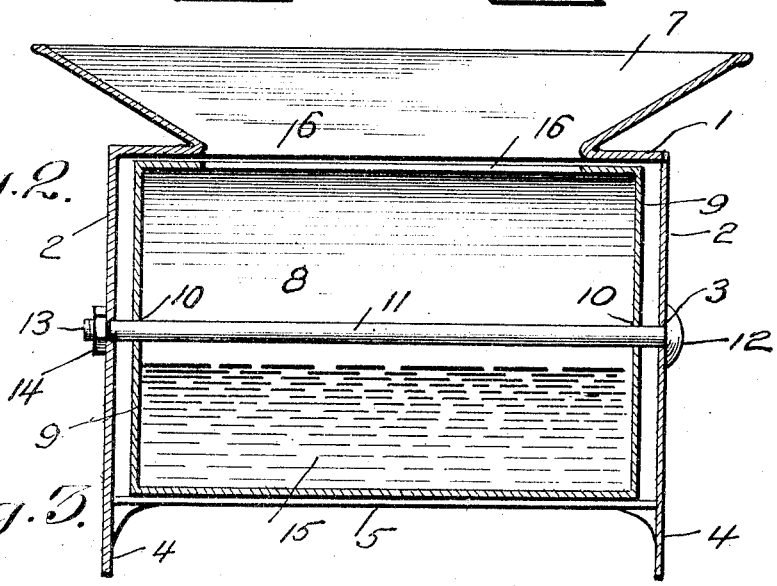
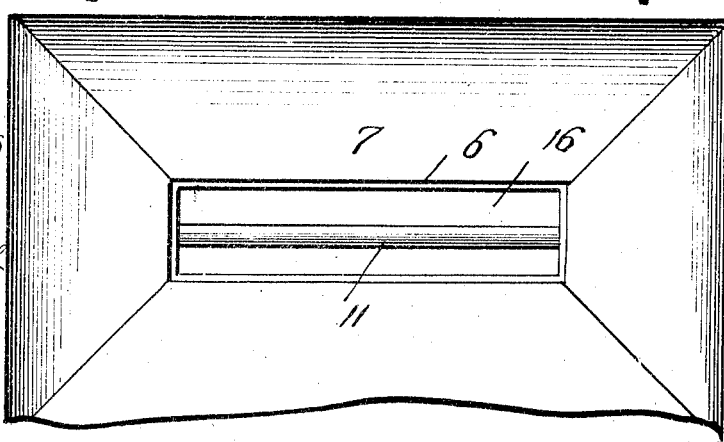
Witnesses
A. H. Rabsag
Inventor:
L. Jakab
By
Attorneys

UNITED STATES PATENT OFFICE.

LADISLAUS JAKAB, OF SOUTH BEND, INDIANA.

CUSPIDOR.

972,081. Specification of Letters Patent. Patented Oct. 4, 1910.

Application filed March 12, 1910. Serial No. 548,763.

*To all whom it may concern:*

Be it known that I, LADISLAUS JAKAB, a subject of the King of Hungary, residing at South Bend, in the county of St. Joseph and State of Indiana, have invented certain new and useful Improvements in Cuspidors, of which the following is a specification, reference being had therein to the accompanying drawing.

This invention relates to cuspidors of that type designed to retain the contents therein when the cuspidor is accidentally tilted or upset.

The object of my invention is to provide a cuspidor of the above type that is simple in construction, durable, and inexpensive to manufacture, the casing of the cuspidor being provided with oppositely disposed openings whereby the cuspidor can be used in an inverted or upright position.

I attain the above object by a mechanical construction that will be hereinafter specifically described and then claimed, and reference will now be had to the drawing forming a part of this specification, wherein there is illustrated a preferred embodiment of the invention, but it is to be understood that the structural elements thereof can be varied or changed without departing from the scope of the appended claim.

In the drawings: Figure 1 is a vertical cross sectional view of the cuspidor. Fig. 2 is a vertical longitudinal sectional view of the same, and Fig. 3 is a plan of a portion of the cuspidor.

In the accompanying drawings the reference numeral 1 denotes a cylindrical casing having the closed ends 2 thereof provided with longitudinally alining openings 3. The closed ends 2 are provided with depending supports or legs 4 and the bottom of said casing is provided with a longitudinal opening 5, extending from one end thereof to the opposite end. The top of the casing 1 is provided with an oblong opening 6 of less length than said casing and connecting with the edges of said opening is a mouth-piece 7, rectangular in plan and funnel-shaped in section, this mouth-piece being designed to deflect matter into the opening 6.

Located in the casing 1 is a cylindrical drum or receptacle 8 having the closed ends 9 thereof provided with longitudinally alining openings 10. Extending through the openings 3 of the casing and the openings 10 of the drum or receptacle 8 is a bolt or rod 11 having one end thereof provided with a head 12 and the opposite end threaded, as at 13, to receive a nut 14. The bolt or rod 11 is adapted to pivotally support the drum or receptacle 8 within the casing whereby said drum or receptacle can revolve upon its longitudinal axis, and the liquid or other matter 15 within said drum or receptacle is adapted to normally retain an oblong opening 16 of said drum or receptacle in registration with the opening 6, whereby other matter can be easily deposited in the drum or receptacle.

The matter within the drum or receptacle 8 is adapted to swing said drum or receptacle when the cuspidor is tilted whereby the contents thereof cannot be spilled through the openings 16 and 6, and when the cuspidor is completely inverted and rests upon the mouth-piece 7, the opening 16 of the drum or receptacle is adapted to register with the opening 5 of the casing, thus allowing the cuspidor to be used until it is again placed in its normal upright position.

The cuspidor in its entirety is made of light and durable metal and one of the end walls 2 of the casing is preferably made detachable, whereby the parts can be easily assembled.

What I claim, is:

A cuspidor comprising a cylindrical casing having an integral end wall and a detachable end wall, and further having its bottom provided with a relatively wide opening extending from one end wall to the other, said casing furthermore provided with an oblong opening extending at a point removed from one end wall to a point removed from the other end wall, a mouth piece integral with the top of said casing and opening into the shorter of said openings, said mouth piece being rectangular in plan and funnel-shaped in cross-section, each of said walls provided with an opening, a cylindrical drum having closed ends and an oblong opening in its top to register with the opening in the top of the casing when the cuspidor is in normal position and to register with the opening in the bottom of the casing when the cuspidor is upside down, the ends of said drum provided with openings registering with the openings in the ends of the casing, a headed bolt extending through said openings and having its head abutting against the outer face of one of the end walls of the casing and its threaded end projecting from the other end wall of the casing, and a nut mounted upon the threaded end of the bolt for securing the latter in position, said bolt constituting means for maintaining the detachable end of the casing in position and furthermore constituting a pivot for the drum.

In testimony whereof I affix my signature in the presence of two witnesses.

LADISLAUS JAKAB.

Witnesses:
 ALEX BUTI,
 GEORG NEMETH.